(12) United States Patent
Bryant et al.

(10) Patent No.: US 7,814,980 B2
(45) Date of Patent: Oct. 19, 2010

(54) MICRO-CROSSLINKED GELS AND ASSOCIATED METHODS

(75) Inventors: Jason E. Bryant, Duncan, OK (US); Thomas D. Welton, Duncan, OK (US); Richard W. Pauls, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/101,103

(22) Filed: Apr. 10, 2008

(65) Prior Publication Data

US 2009/0255677 A1  Oct. 15, 2009

(51) Int. Cl.
*E21B 43/22* (2006.01)
*E21B 43/267* (2006.01)
*E21B 43/04* (2006.01)

(52) U.S. Cl. ............... 166/300; 166/278; 166/281; 166/280.1; 166/308.5

(58) Field of Classification Search ............... None
See application file for complete search history.

(56) References Cited

U.S. PATENT DOCUMENTS

| | | | |
|---|---|---|---|
| 4,282,928 A | 8/1981 | McDonald et al. ......... 166/274 |
| 4,363,736 A | 12/1982 | Block | |
| 4,460,751 A | 7/1984 | Hanlon et al. | |
| 4,797,216 A | 1/1989 | Hodge | |
| 4,809,782 A | 3/1989 | Shu | |
| 4,834,182 A | 5/1989 | Shu | |
| 4,871,021 A | 10/1989 | Shu | |
| 4,909,324 A | 3/1990 | Shu | |
| 4,980,393 A | 12/1990 | Shu | |
| 5,439,057 A | 8/1995 | Weaver et al. | |
| 5,558,161 A | 9/1996 | Vitthal et al. | |
| 5,680,900 A | 10/1997 | Nguyen et al. | |
| 6,072,101 A * | 6/2000 | Beihoffer et al. ............ 604/372 |
| 6,114,410 A | 9/2000 | Betzold | |
| 6,257,335 B1 | 7/2001 | Nguyen et al. | |
| 6,488,091 B1 | 12/2002 | Weaver et al. | |
| 6,913,080 B2 | 7/2005 | Lehman et al. | |
| 7,000,702 B2 | 2/2006 | Hanes, Jr. et al. | |
| 7,001,872 B2 | 2/2006 | Pyecroft et al. | |
| 7,004,255 B2 | 2/2006 | Boney | |
| 7,082,995 B2 | 8/2006 | Hanes, Jr. et al. | |

(Continued)

FOREIGN PATENT DOCUMENTS

EP   1 086 976 A1   3/2001

(Continued)

OTHER PUBLICATIONS

CL-29™ Crosslinker product data sheet, 2008.

(Continued)

*Primary Examiner*—Zakiya W. Bates
(74) *Attorney, Agent, or Firm*—Robert A. Kent; McDermott Will & Emery LLP

(57) ABSTRACT

Methods of forming and utilizing micro-crosslinked gels are disclosed, including a method comprising: providing a micro-crosslinked gel that comprises micro-domains; and placing the micro-crosslinked gel into a subterranean formation via a well bore penetrating the formation at a desired pressure. In another aspect, the invention provides compositions that include a micro-crosslinked gel comprising a jigsaw configuration of micro-domains and particulates.

23 Claims, 9 Drawing Sheets

U.S. PATENT DOCUMENTS

| | | |
|---|---|---|
| 7,311,145 B2 | 12/2007 | Lehman et al. |
| 7,322,411 B2 | 1/2008 | Brannon et al. |
| 7,331,389 B2 | 2/2008 | Lehman et al. |
| 2003/0050758 A1 | 3/2003 | Soliman et al. |
| 2004/0040708 A1 | 3/2004 | Stephenson et al. |
| 2005/0034868 A1 | 2/2005 | Frost et al. |
| 2005/0137094 A1 | 6/2005 | Weaver et al. |
| 2005/0187114 A1 | 8/2005 | Lehman et al. |
| 2006/0048943 A1 | 3/2006 | Parker et al. |
| 2006/0065396 A1 | 3/2006 | Dawson et al. ............. 166/279 |
| 2006/0113078 A1 | 6/2006 | Nguyen et al. |
| 2006/0166834 A1 | 7/2006 | Roddy |
| 2006/0196662 A1 | 9/2006 | Hanes, Jr. et al. |
| 2007/0062702 A1 | 3/2007 | Walters et al. |
| 2007/0062703 A1 | 3/2007 | Walters et al. |
| 2007/0079961 A1 | 4/2007 | Morgan et al. |
| 2007/0244014 A1 | 10/2007 | Weaver et al. |
| 2007/0256836 A1 | 11/2007 | Welton et al. |
| 2007/0281868 A1 | 12/2007 | Pauls et al. |
| 2008/0035342 A1 | 2/2008 | Saini et al. |
| 2008/0039347 A1 | 2/2008 | Welton et al. ............... 507/213 |
| 2008/0135247 A1 | 6/2008 | Hutchins ................... 166/283 |
| 2008/0194427 A1 | 8/2008 | Welton et al. |
| 2008/0194428 A1 | 8/2008 | Welton et al. |
| 2008/0194430 A1 | 8/2008 | Welton et al. |
| 2009/0255668 A1 | 10/2009 | Fleming et al. |
| 2009/0270280 A1 | 10/2009 | Zhang et al. |

FOREIGN PATENT DOCUMENTS

| | | |
|---|---|---|
| GB | 2412390 A | 9/2005 |

OTHER PUBLICATIONS

Borate Crosslinked Fluids product information at http://www.halliburton.com, Mar. 19, 2008.

N-VIS™ product data sheet, Sep. 5, 2006.

SPE 96848: "High-Porosity Fractures Yield High Conductivity", M. Parker, G. Glasbergen, D. van Batenburg, J. Weaver, B. Slabaugh, Oct. 9, 2005.

"Hydraulic Fracturing Technology, High Porosity Fracturing, FDP-S729-04", 2004.

International Search Report and Written Opinion for PCT/GB2009/000906 dated Oct. 30, 2009.

Office Action for U.S. Appl. No. 12/101,099, dated Sep. 28, 2009.

International Search Report and Written Opinion of Application No. PCT/GB2009/000844, Mar. 30, 2009.

Office Action for U.S. Appl. No. 12/101,099 dated Apr. 19, 2010.

\* cited by examiner

_US 7,814,980 B2_

MICRO-CROSSLINKED GELS AND ASSOCIATED METHODS

BACKGROUND

The present invention relates to improved treatment fluids for use in subterranean applications, and, at least in some embodiments, to micro-crosslinked gels and their associated methods of use. As used herein, the term "micro-crosslinked gel" refers to a gel that comprises small, substantially non-contiguous, substantially permanently crosslinked volumes, hereinafter referred to as "micro-domains." These will be described more thoroughly herein. The term "gel," as used herein and its derivatives refer to a viscoelastic or semi-solid, jelly-like state assumed by some colloidal dispersions.

Hydraulic fracturing is a process commonly used to increase the flow of desirable fluids, such as oil and gas, from a portion of a subterranean formation. Hydraulic fracturing operations generally involve placing a viscous fracturing fluid into a subterranean formation or zone at a rate and pressure sufficient to cause the formation or zone to break down with the attendant production of one or more fractures. The pressure required to induce fractures in rock at a given depth is known as the "fracture gradient." Enhancing a fracture includes enlarging a pre-existing fracture in the formation. As the fracture is created or enhanced, a portion of the fluid contained in the viscous fracturing fluid leaks off into the formation, and a filter cake comprised of deposited gelling agent is built up on the walls of the fracture. Particulates, such as grains of sand, may be suspended in the fracturing fluid and introduced into the created fractures. As the viscous fracturing fluid leaks off into the formation, particulates aggregate in proppant packs within the fracture. The proppant packs function to prevent the fracture from fully closing upon the release of pressure, forming conductive channels through which fluids may flow to (or from) the well bore.

Gravel packing is another subterranean application that involves the use of particulates suspended in a viscous fluid. A "gravel pack" is used to at least partially reduce the migration of unconsolidated formation fines into the well bore. To form a gravel pack, particulate material, such as sand, is delivered downhole suspended in a viscous fluid. The fluid may then leak-off into the formation or be recovered from the well bore. Gravel packing operations commonly involve placing a gravel pack screen in the well bore neighboring a specified portion of the subterranean formation and packing the annulus between the screen and the subterranean formation with particulate materials. The particulates are sized to inhibit the passage of formation fines through the gravel pack with produced fluids. In some instances, a screenless gravel packing operation may be performed.

In some situations, hydraulic-fracturing operations and gravel-packing operations may be combined into a single operation to stimulate production and to reduce the production of unconsolidated formation particulates. Such treatments are often referred to as "frac-pack" operations. In some cases, these treatments are completed with a gravel-pack screen assembly in place with the fracturing fluid being pumped through the annular space between the casing and screen. In such a situation, the fracturing operation may end in a screen-out condition creating an annular gravel pack between the screen and casing.

In subterranean applications, a treatment fluid should have a sufficiently high viscosity to suspend the particulates as the treatment fluid is injected into the well bore and formation fractures. As used herein, the term "treatment fluid" refers generally to any fluid that may be used in a subterranean application in conjunction with a desired function and/or for a desired purpose. The term "treatment fluid" does not imply any particular action by the fluid or any component thereof. A "particulate-laden treatment fluid" is a treatment fluid that comprises particulates such as proppant or gravel.

Gelling agents have heretofore been utilized to gel a base fluid, producing a treatment fluid with adequately high viscosity. These gelling agents can be biopolymers or synthetic polymers that, when hydrated and at a sufficient concentration, are capable of forming a more viscous fluid. Common gelling agents include polysaccharides (such as xanthan, guar gum, diutan, succinoglycan, scleroglucan, etc.), synthetic polymers (such as polyacrylamide, polyacrylate, polyacrylamide copolymers, and polyacrylate copolymers), and surfactant gel systems. Guar and derivatized guar polymers, such as hydroxypropylguar, are economical water soluble polymers which can be used to create high viscosity aqueous fluids. Surfactant gel systems also have been used in subterranean formations at these temperatures, but such systems can be expensive, can be sensitive to impurities, and may require hydrocarbon breakers. To increase the viscosity of the resultant treatment fluid, the gelling agents may be crosslinked through an applicable crosslinking reaction comprising a crosslinking agent. Conventional crosslinking agents usually comprise a metal complex or other compound that interacts with at least two polymer molecules to form a "crosslink" between them. Oftentimes, for example to decrease pipe friction and/or provide a "lipping gel" (defined below) for particulate suspension and transportation, it is generally preferred that crosslinking occur very close in time to when the gel is introduced to a desired portion of a formation.

Typically, after a high viscosity, particulate-laden treatment fluid is pumped into a well bore and the particulates are placed as desired, the treatment fluid will be caused to revert into a low viscosity fluid. This process is often referred to as "breaking" the fluid. The treatment fluid "breaks," or decreases in viscosity, so that it can more easily be removed from the well, while leaving a proppant and/or gravel pack in the fracture. Breaking the gel is most commonly accomplished by adding a breaker to the treatment fluid prior to pumping it into the well bore. Breakers, such as oxidizers, enzymes, and acid release agents, have been used successfully. Depending on the crosslinking agent used, a fluid may be broken by "delinking" the crosslinks between the gelling agent molecules. In such instances, this may be useful because oftentimes the fluid can be recovered, recrosslinked, and reused, whereas more typical "broken" fluids cannot.

Historically, to be considered to be a suitable particulate-laden treatment fluid for use in many subterranean applications, it has been believed that the crosslinked gels need to exhibit sufficient viscoelastic properties, in particular relatively high viscosities (e.g., at least about 300-500 cP at a shear rate of 100 $sec^{-1}$). One aspect of such gel behavior may be described in the art as "lipping," which may be distinguishable from freely pouring when poured out of a container. One example of a "lipping" gel is illustrated in FIG. 1A, contrasted with one example of a "nonlipping" gel illustrated in FIG. 1B. "Lipping" as used herein refers to a gel having sufficient homogeneous, three-dimensional elasticity on a macroscopic level with very few, if any, distinct micro-domains. Such lipping gels may be referred to herein as "macro-crosslinked gels."

One problem associated with some gelled treatment fluids is that they are not able to continue to suspend particulates at elevated temperatures for a desirable length of time. This can pose significant challenges to subterranean applications that operate at elevated in situ temperatures. To offset this tendency, some have tried increasing the concentration of gelling or crosslinking agents in the treatment fluids. However, this has not proven to be an optimal solution because of the increased friction pressures that results. This makes pumping the treatment fluid more difficult and may increase the cost of the job. Additionally, the filter cake produced from the treatment fluids is often thick, tacky, and relatively difficult to remove from the walls of the well bore and the surfaces of the fractures in the subterranean formation.

Another disadvantage associated with using some gelled treatment fluids is that they can leave residue in the formation that can impact the productivity of the well. Residue may result from the continuing presence of the insoluble portions of the gelling agents, such as proteins, cellulose and fibers, in the pores of the subterranean zones being treated as well as gravel packs and proppant packs in the zones.

In subterranean applications such as well bore cleanout, the objectives are primarily focused on displacement of drilling fluids or other fluids occupying the well bore and removal of drilling fluid residue and other contaminants occupying the well bore. In this regard, a displacement fluid, sometimes called a spacer fluid, is used. Oftentimes, coiled tubing may be used to place the displacement fluid in the well bore. The displacement fluid may be a gelled treatment fluid. It is generally believed that the displacement fluid should be similar in density to the drilling or other fluid occupying the well bore to prevent substantial commingling of these fluids during the displacement process. Additionally, the displacement fluid often contains an agent to aid in removing contaminants adhering to the well bore walls as well as certain solids which may be loosely in residence in the well bore. Often, this also results in the removal of well bore-fill material, such as sand, scale, or organic materials, and other debris from the well bore.

In many subterranean applications, it is desirable for a treatment fluid to inhibit the amount of leakage of the liquid phase of a treatment fluid into the formation matrix. Fluid loss control agents are often used to control the process and avoid potential reservoir damage. This is also thought to be helpful in maintaining fracture width and length.

In some subterranean applications, it may be desirable to divert the flow of treatment fluids. In other subterranean applications, it may be desirable to divert the flow of formation fluids, such as preventing the excessive production of formation brine. Since fluids may tend to follow the path of least resistance, fluid flow may be diverted for example, by invading the higher permeability portions of the formation with a fluid that has high viscosity at low shear rates.

SUMMARY

The present invention relates to improved treatment fluids for use in subterranean applications, and, at least in some embodiments, to micro-crosslinked gels and their associated methods of use.

In one embodiment, a method of using micro-crosslinked gels comprises the following steps. Providing a micro-crosslinked gel that comprises micro-domains. Placing the micro-crosslinked gel into a subterranean formation via a well bore penetrating the subterranean formation at a desired pressure.

In another embodiment, a method of preparing micro-crosslinked gels comprises the following steps. Providing a base gel, wherein the base gel comprises a base fluid and a gelling agent. Providing a crosslinking agent. Crosslinking at least a portion of the gelling agent in the base gel with the crosslinking agent to form a substantially permanently crosslinked gel. Applying shear to the substantially permanently crosslinked gel so as to form a micro-crosslinked gel that comprises at least a plurality of micro-domains.

In another embodiment, a method of using micro-crosslinked gels comprises the following steps. Providing a base gel, wherein the base gel comprises a base fluid and a gelling agent. Providing a crosslinking agent. Crosslinking at least a portion of the gelling agent in the base gel with the crosslinking agent to form a substantially permanently crosslinked gel. Applying shear to the substantially permanently crosslinked gel so as to form a micro-crosslinked gel that comprises at least a plurality of micro-domains and a plurality particulates. Placing the micro-crosslinked gel into a subterranean formation via a well bore penetrating the subterranean formation at a pressure that is above the fracture gradient of the subterranean formation.

In another embodiments, a method of using micro-crosslinked gels comprises the following steps. Providing a base gel, wherein the base gel comprises a base fluid and a gelling agent. Providing a crosslinking agent. Crosslinking at least a portion of the gelling agent in the base gel with the crosslinking agent to form a substantially permanently crosslinked gel. Applying shear to the substantially permanently crosslinked gel so as to form a micro-crosslinked gel that comprises at least a plurality of micro-domains and a plurality particulates. Placing the micro-crosslinked gel in a subterranean formation. Forming a gravel pack in or near a selected portion of the subterranean formation.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1B:
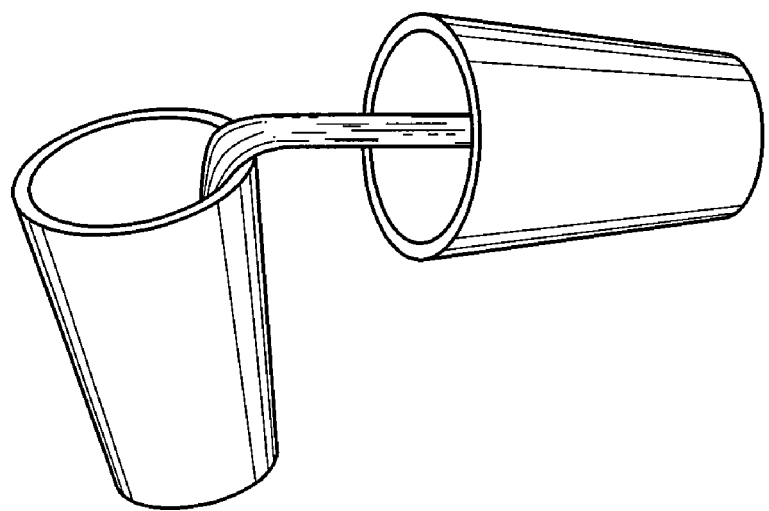
FIG. 1 illustrates examples of a "lipping" gel and a "non-lipping" gel.
Figure 1A:
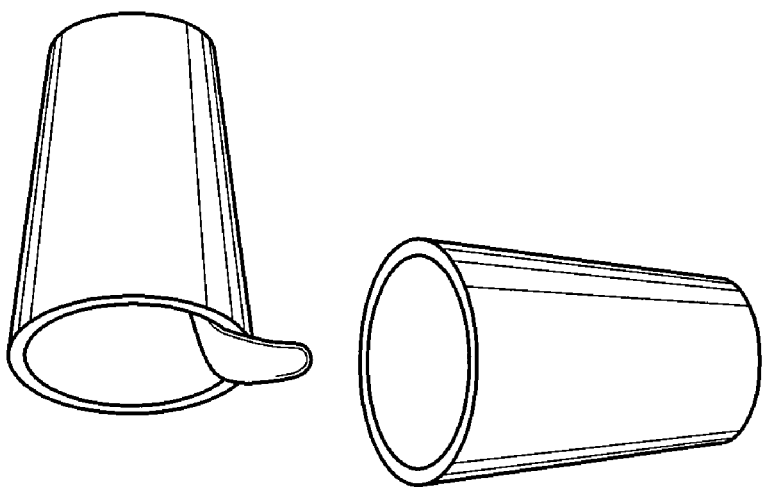

The present invention relates to improved treatment fluids for use in subterranean applications, and, at least in some embodiments, to micro-crosslinked gels and their associated methods of use.

The term "gel," as used herein and its derivatives refer to a viscoelastic or semi-solid, jelly-like state assumed by some colloidal dispersions.

As used herein, the term "micro-crosslinked gel" refers to gel that comprises small, substantially noncontiguous, substantially permanently crosslinked volumes, hereinafter referred to as "micro-domains."

As used herein, the term "treatment fluid" refers generally to any fluid that may be used in a subterranean application in conjunction with a desired function and/or for a desired purpose. The term "treatment fluid" does not imply any particular action by the fluid or any component thereof.

As used herein, the term "particulate-laden treatment fluid" is a treatment fluid that comprises particulates such as proppant or gravel.

"Lipping" as used herein refers to a gel having sufficient homogeneous, three-dimensional elasticity on a macroscopic level with very few, if any, distinct micro-domains.

A gelled fluid which exhibits lipping behavior may be referred to herein as a "macro-crosslinked gel."

As used herein, "substantially permanently crosslinked gel" may refer to a crosslinked gel which exhibits a crossover frequency of about 0.001 radians per second or less during a small-amplitude oscillatory shear test at 200° F. It is believed that a "substantially permanently crosslinked gel" will remain permanently (i.e., not dynamically) crosslinked through the duration of a subterranean application in which it is being used. A person of ordinary skill in the art with the benefit of this disclosure would be capable of performing an appropriate small-amplitude oscillatory shear test.

The term "gelling agent" as used herein is defined to include any substance that is capable of increasing the viscosity of a fluid, for example, by forming a gel.

As used herein, the term "base gel" refers to a gel formed by combining a gelling agent and a base fluid. A base gel has not been crosslinked or sheared to form a micro-crosslinked gel of the present invention.

The term "crosslinking agent" as used herein is defined to include any substance that is capable of promoting or regulating intermolecular bonding between polymer chains, linking them together to create a more rigid structure.

As used herein, the term "clarified xanthan" refers to a xanthan that has a flow rate of at least about 200 ml in 2 minutes at ambient temperature in a filtering laboratory test on a Baroid Filter Press using 40 psi of differential pressure and a 9 cm Whatman filter paper having a 2.7 µm pore size.

As used herein, "nonacetylated" means having fewer acetyl groups than typical xanthan, whether the difference is the result of genetic engineering or bacteria selection or the result of chemical treatment of a typical xanthan. As used herein, "nonpyruvylated" means having fewer pyruvyl groups, whether the difference is the result of genetic engineering or bacteria selection or the result of chemical treatment of a xanthan. Furthermore, as used herein, nonpruvylated and nonacetylated are intended to encompass depruvylated and deacetylated, respectively.

The term "clarified diutan" as used herein refers to a diutan that has improved turbidity and/or filtration properties as compared to nonclarified diutan.

As used herein, the term "adhesive substance" refers to a material that is capable of being coated onto a particulate and that exhibits a sticky or tacky character such that the proppant particulates that have adhesive thereon have a tendency to create clusters or aggregates.

As used herein, the term "tacky," in all of its forms, generally refers to a substance having a nature such that it is (or may be activated to become) somewhat sticky to the touch.

The term "irreversible" as used herein means that a degradable material, once degraded downhole, should not recrystallize or reconsolidate, e.g., the degradable material should degrade in situ but should not recrystallize or reconsolidate in situ.

The term "crossover frequency" is defined herein to refer to the frequency at which the storage modulus and loss modulus of the fluid are equal at lower frequencies and the loss modulus becomes larger than the storage modulus as frequency decreases, as determined with a small-amplitude oscillatory shear ("SAOS") frequency sweep test.

As used herein, the term "partial monolayer fracture" refers to a fracture in a subterranean formation, wherein spaced proppant particulates or aggregates reside in the open space of the fracture, and wherein the separation between the fracture faces may be less than, or about the same as, the largest exterior dimension of any one of the proppant particulates or aggregates.

As used herein, the term "partial monolayer" may refer to the distribution of proppant particulates or aggregates in a partial monolayer fracture.

As used herein, the term "fracture gradient" may refer to the pressure required to induce fractures in rock at a given depth. A person of ordinary skill in the art with the benefit of this disclosure would be capable of determining the fracture gradient of a given formation.

If there is any conflict in the usages of a word or term in this specification and one or more patent or other documents that may be incorporated herein by reference, the definitions that are consistent with this specification should be adopted.

Figure 2:
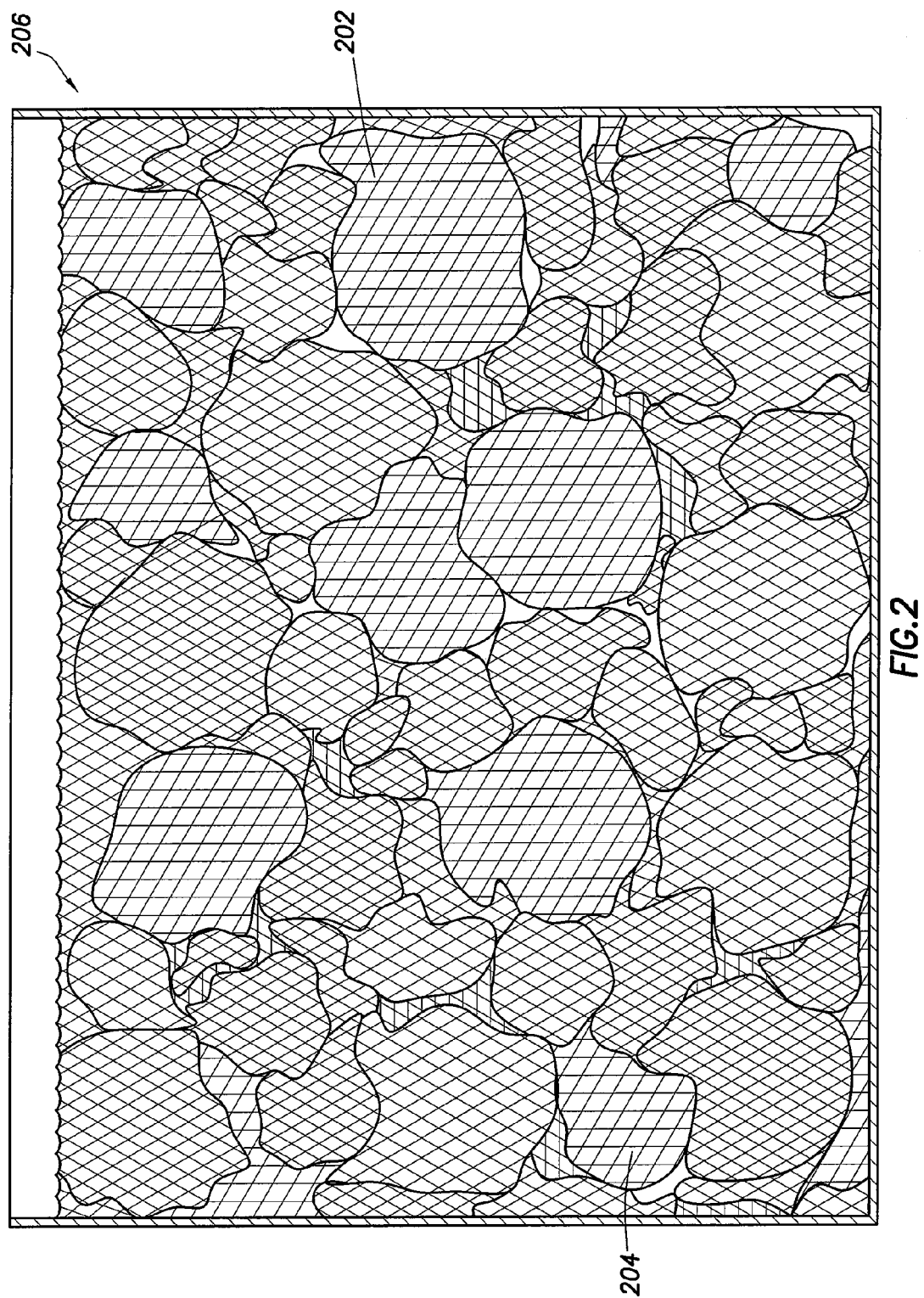
FIG. 2 illustrates a schematic depiction of one embodiment of a micro-crosslinked gel of the present invention.

FIG. 2 schematically illustrates a micro-crosslinked gel of the present invention. Shown at 202 and 204 are micro-domains in micro-crosslinked gel 206. In some instances, in a single gel, the micro-domains are substantially separate crosslinked volumes that may be overlapping, adjacent, or detached (e.g., simplistically represented by the varying volumes in FIG. 2 that fit together in a somewhat jigsaw puzzle fashion). This should be distinguished from a continuous, cross-linked polymer phase having a relatively low density of crosslinking with domains of clustered, high density crosslinking. The micro-domains comprise substantially permanently crosslinked molecules, which will be discussed below in greater detail. Although it is believed that crosslinks do not form between micro-domains in a given gel, in some instances, it is believed that some molecular inter-domain interaction may be possible. However, this inter-domain interaction is minimal in comparison to the intra-domain molecular interaction within an individual domain. But, generally speaking, each micro-domain is believed to comprise a relatively separate crosslinked volume.

Figure 3:
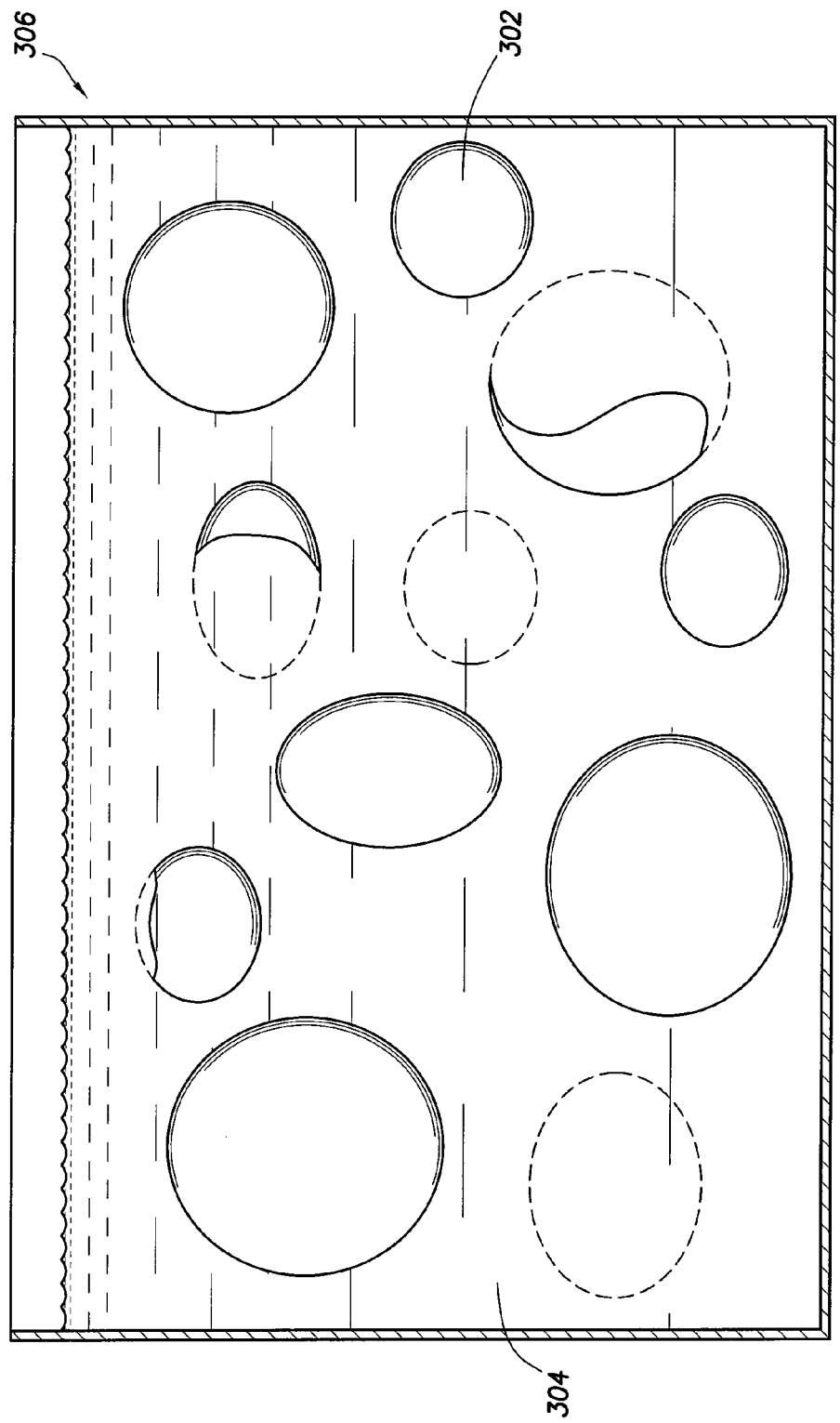
FIG. 3 illustrates a typical emulsion structure.

The micro-crosslinked gels of the present invention are distinguishable from foams or emulsions. First, the micro-domains of the micro-crosslinked gels of the present invention are not suspended within a continuous phase, whereas as illustrated in FIG. 3, typical foams or emulsions comprise two or more immiscible fluid phases. The micro-crosslinked gels of the present invention (e.g., FIG. 2) may comprise a single phase consisting essentially of micro-domains (with optional additives such as particulates). Shown at 302 is the discontinuous phase, and at 304 is the continuous phase of typical emulsion 306. Although emulsions and the micro-crosslinked gels of the present invention are distinguishable, in some embodiments, a micro-crosslinked gel of the present invention may be used to form a phase of an emulsion with a fluid in which the micro-crosslinked gel is immiscible.

There may be several potential advantages to the methods and compositions of the present invention, only some of which are alluded to herein. While the compositions and methods of the present invention may be suitable for use in a variety of subterranean applications, they may be particularly useful in treatments for subterranean formations comprising elevated temperatures. In some embodiments, the present invention provides micro-crosslinked gels and methods that may be especially suitable for use in well bores comprising a bottom hole static temperature ("BHST") of up to about 350° F. or above. In some embodiments, the BHST may be between about 350° F. and about 450° F. In certain embodiments, the BHST may be above about 450° F. One skilled in the art will recognize that there are a number of instances where a fluid may be used successfully at temperatures above the temperature limit of the fluid (e.g., a temperature at which the fluid no longer exhibits significant suspension and transport properties) when well bore and/or formation cool-down is taken into account. The ability of the micro-crosslinked gels of the present invention to maintain a degree of viscosity at such elevated temperatures may be affected by the time a particular fluid is exposed to such temperatures.

Another potential advantage may be that micro-crosslinked gels of the present invention may leave less gel residue in the formation than conventional macro-crosslinked gels.

One of the distinguishing features of the micro-crosslinked gels of the present invention is that they may not exhibit lipping behavior (as with gels having viscosities in the range of at least about 300-500 cP at a shear rate of 100 sec$^{-1}$), thereby potentially enabling the fluid to be pumped more easily, yet they have sufficient particulate suspension capabilities to be useful as particulate-laden treatment fluids in subterranean applications. This has been a surprising discovery given that nonlipping gels have heretofore been viewed as not suitable for use as particulate-laden treatment fluids. Without limiting the invention to a particular theory or mechanism of action, it is currently believed that micro-crosslinked gels of the present invention may have lower high-shear viscosities than typical lipping gels. Micro-crosslinked gels may thereby provide lower pipe friction than typical lipping gels. Another advantage may be less gel loadings when compared with fluids that have heretofore been used for particulate transport at elevated temperatures.

Figure 4:
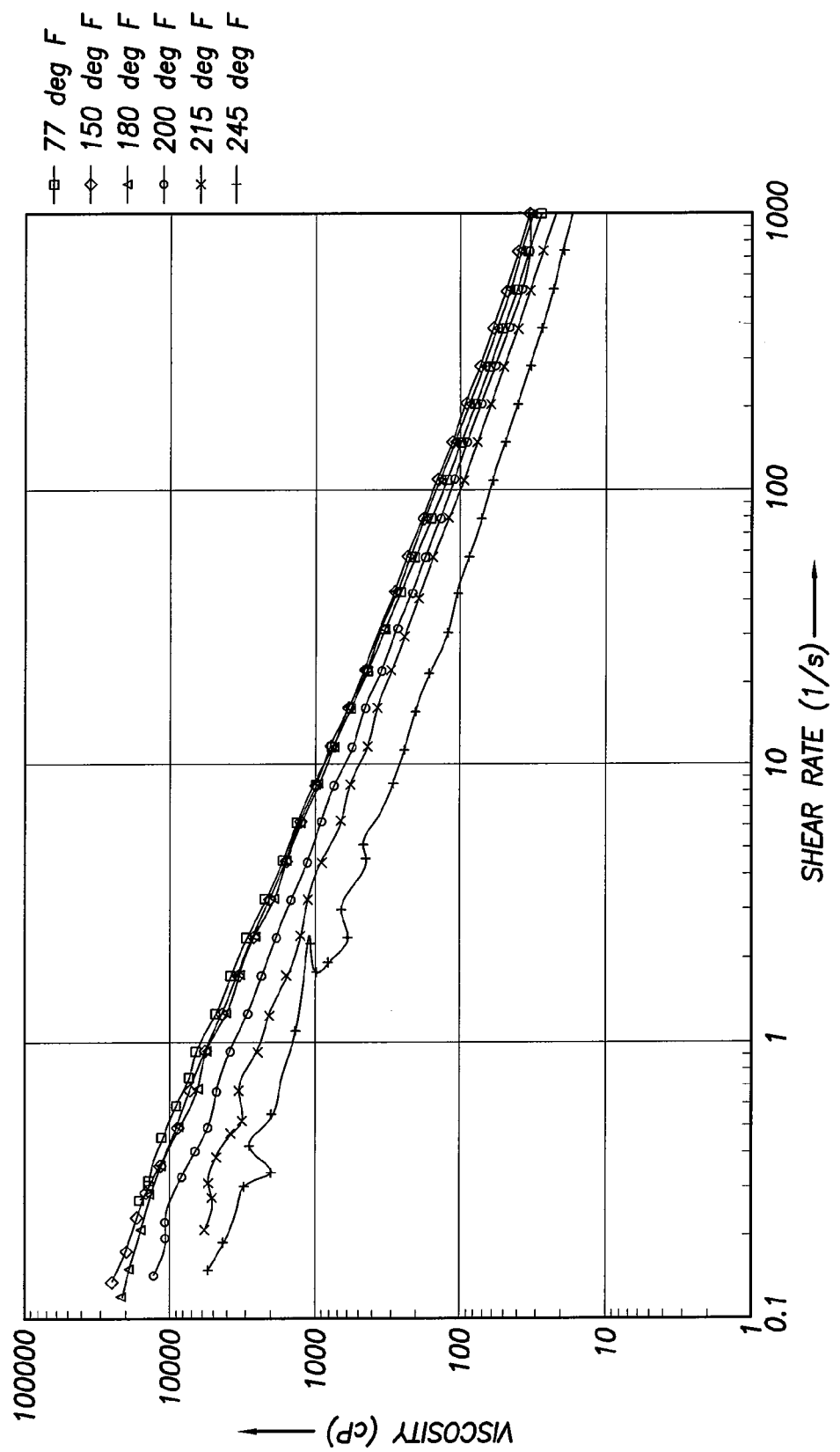
FIG. 4 illustrates viscosity as a function of shear rate at various temperatures for a micro-crosslinked gel of the present invention.
Figure 5:
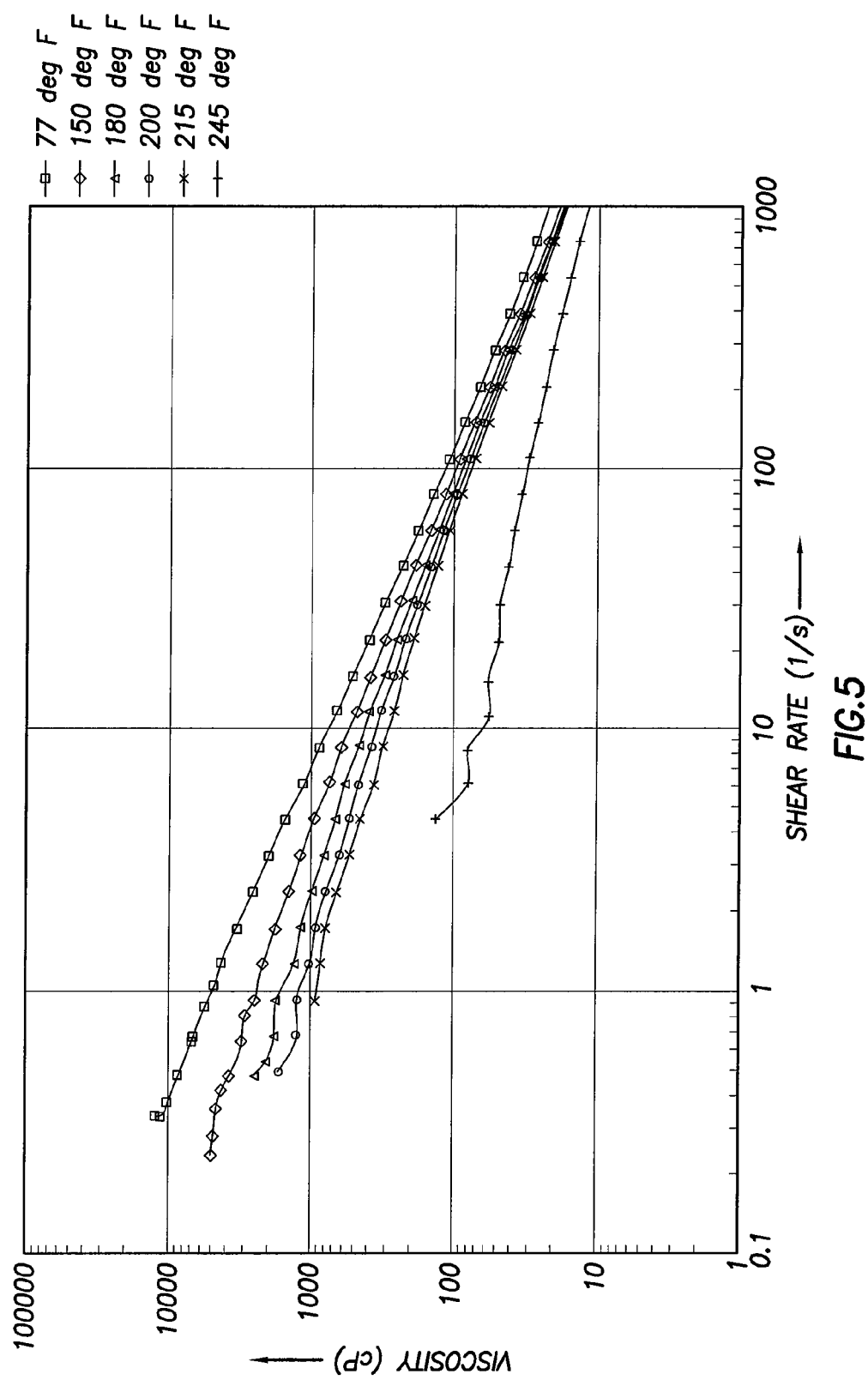
FIG. 5 illustrates viscosity as a function of shear rate at various temperatures for a noncrosslinked xanthan gel.

One of the many potential advantages may be that micro-crosslinked gels of the present invention may have improved particulate suspension properties at elevated temperatures, for example, those of about 260° F. or more. One of ordinary skill in the art with the benefit of this disclosure would be able to implement a suitable method for determining particle suspension properties. The improved particulate suspension and transportation properties of the micro-crosslinked gels of the present invention may be particularly advantageous for applications requiring extended periods of particulate suspension, such as, for example, during unscheduled shut-in of a well bore. In some embodiments of the invention, particulates may remain in suspension in a micro-crosslinked gel for periods of time up to about 72 hours at temperatures of up to 450° F. In some embodiments of the invention, particulates may remain in suspension in a micro-crosslinked gel for periods of time of about 2 hours to about 20 hours at typical subterranean temperatures. In some embodiments, particulates may remain in suspension in a micro-crosslinked gel for periods of time of about 20 hours to about 48 hours at typical subterranean temperatures. While not wishing to limit the invention to a particular theory or mechanism of action, it is currently believed that the viscosity of a micro-crosslinked gel of the present invention is not the primary factor influencing the particulate suspension and transport properties of the micro-crosslinked gel. Instead, it is believed that particulate suspension and transport properties of the micro-crosslinked gel may be due to the relative stacking of micro-domains within the gel. FIG. 4 illustrates some particulate transport properties of one micro-crosslinked gel of the present invention. In particular, as is apparent from those examples shown in this Figure, it is believed that at least in some embodiments, the viscosities of the illustrated micro-crosslinked gel at elevated temperatures are higher than the viscosities of a non-crosslinked base gel, as depicted in FIG. 5.

Figure 6:
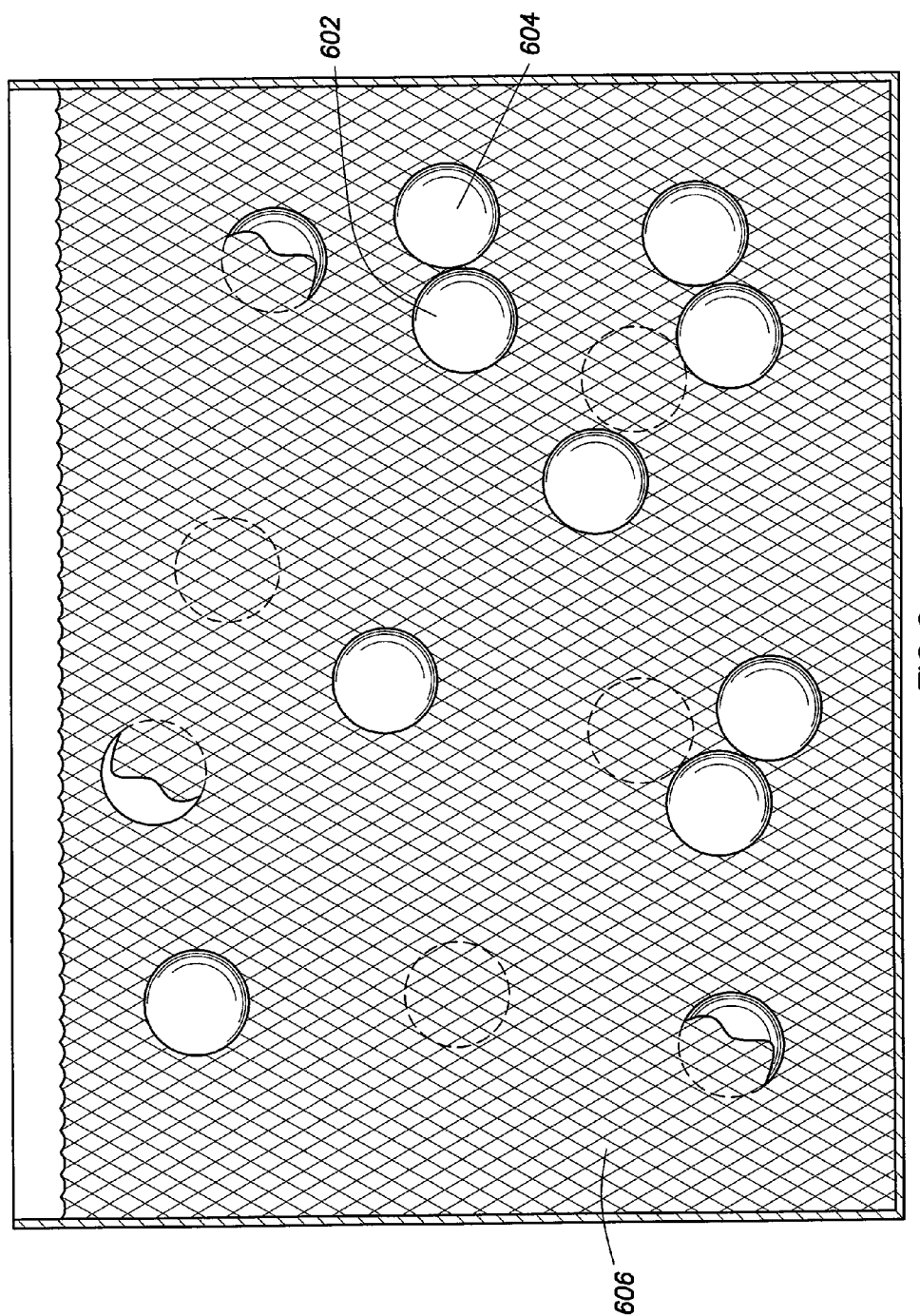
FIG. 6 illustrates a schematic depiction of a macro-crosslinked gel with particulates in suspension.
Figure 7:
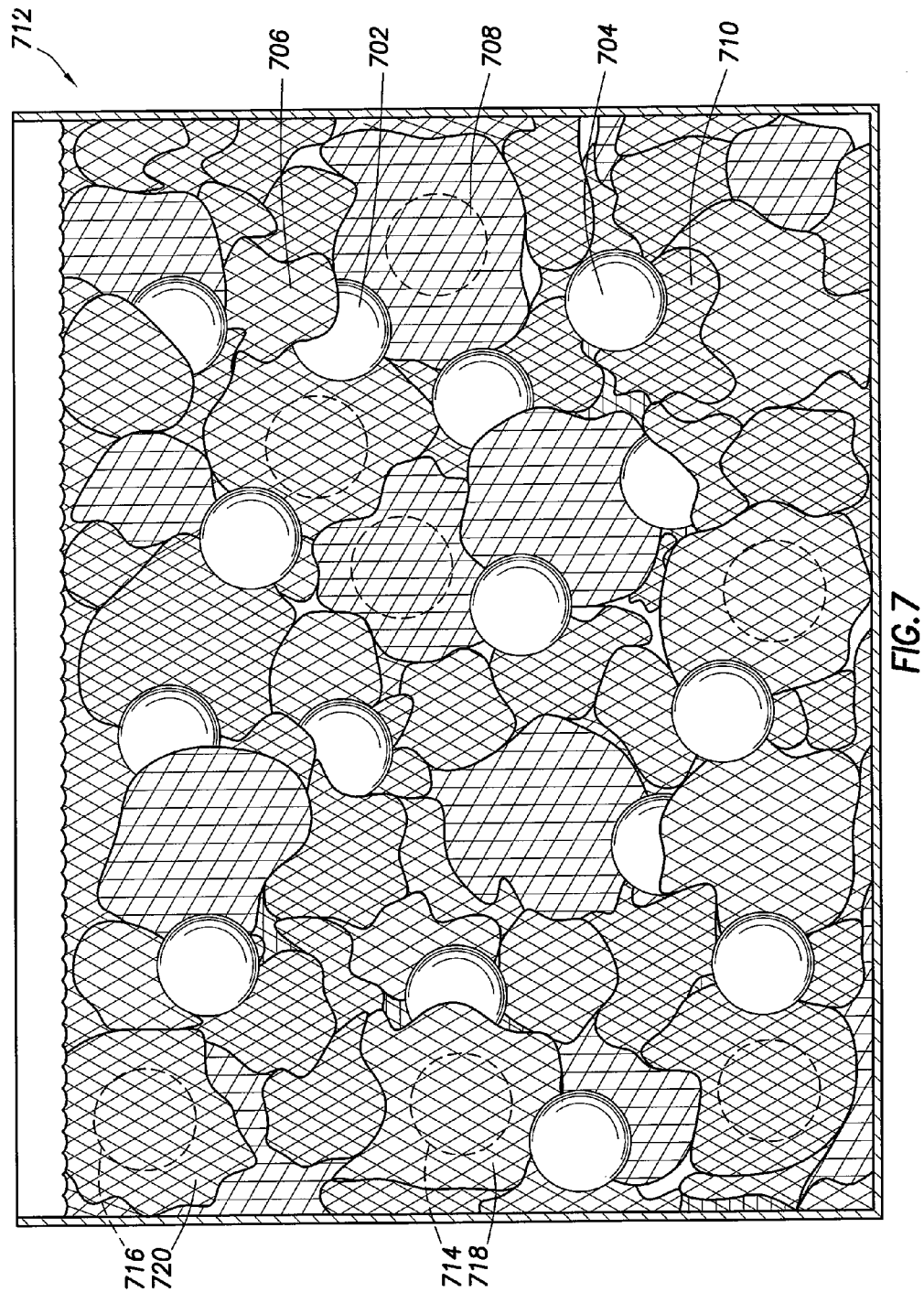
FIG. 7 illustrates a schematic depiction of one embodiment of a micro-crosslinked gel with particulates in suspension.

Without limiting the invention to a particular theory or mechanism of action, it is currently believed the improved particulate suspension properties may result from the presence, configuration, and interactions of the micro-domains in a micro-crosslinked gel of the present invention. Particulates may be held within an individual micro-domain or held between multiple micro-domains in a three-dimensional landscape. These improved particulate suspension properties may be contrasted to the particulate settling properties of typical lipping gelled treatment fluids, in which it is believed that particulate clustering or aggregation may increase particulate settling rates. As illustrated in FIG. 6, particulates 602 and 604 in a macro-crosslinked gel treatment fluid 606 are thought to tend settle as a result of stress relaxation. In the micro-crosslinked gels of the present invention, the micro-domains are thought to inhibit particulate clustering or aggregation, thereby decelerating particulate settling rates, even at elevated BHSTs. FIG. 7, illustrating one embodiment of the invention, shows particulates 702 and 704 interspersed between micro-domains 706, 708, and 710 of a micro-crosslinked gel 712. In some embodiments of the invention, there may be particulates 714 and 716 which reside inside micro-domains 718 and 720, respectively. Although the particulates are shown in spherical form in FIGS. 6 and 7, it should be understood that this is representative only for explanation purposes, and that the particulates and micro-domains may have any suitable shape and composition desired. Additionally, the substantially permanently crosslinked nature of the micro-domains may prevent stresses from relaxing in the micro-crosslinked gel resulting in dropping particulates out of suspension. Typical macro-crosslinked gel treatment fluids utilized in subterranean applications may have a finite relaxation time, during which applied stresses decay. It is believed that the density difference between the particulates and the fluid will cause a stress on the fluid, and in accordance with the gel's finite relaxation time, will cause the particulates to settle out of the fluid. In the micro-crosslinked gels of the present invention, it is believed that they do not have a finite relaxation time relative to the job timeframe, and therefore, would not be subject to these stresses that may drive particulate settling. Moreover, the macroscopic density of the micro-crosslinked gel may be relatively uniform, so there may be no impetus for a given micro-domain (or grouping of micro-domains) to settle versus other micro-domains.

The micro-crosslinked gels of the present invention generally comprise micro-domains that comprise a substantially permanently crosslinked gel. The micro-domains may be any shape, for example, irregular three-dimensional that may be overlapping, adjacent, or detached (e.g., simplistically represented by the varying volumes in FIG. 2 that fit together in a somewhat jigsaw puzzle fashion). Depending on the method in which the micro-domains are created, the shape and the size of the micro-domains can vary. Also, in any given micro-crosslinked gel, the micro-domains may have a distribution of size and shape relative to one another. Again, however, no particular size or shape is critical for use in the present invention.

The crosslink density in a chosen micro-domain may vary depending on, among other things, the method of making to micro-crosslinked gel, the reaction time of the crosslinking reaction versus mixing time, or the point at which a crosslink forms on a given polymer chain of the gelling agent. Within a given micro-domain, it is believed that the crosslink density should be relatively uniform for a given standard volume.

The micro-domains may be of any suitable size. The size is thought to be due in large part to the shearing conditions during the manufacturing of the micro-crosslinked gel. If less shear is used, the micro-domains may be relatively large. In some embodiments, the very large micro-domains may have external dimensions of any size up to about 5000 microns. In some embodiments, the micro-domains may be smaller, with external dimensions in the range of about 50 microns to 500 microns. In some embodiments, the micro-domains may be even smaller, with external dimensions in the range of about 20 microns to about 50 microns. In some embodiments, the micro-domains may be smaller still, with external dimensions in the range of about 10 microns to about 20 microns. In some embodiments, the micro-domains may be very small, having external dimensions in the range of about 0.5 microns to about 10 microns. One of ordinary skill in the art would be able to select an appropriate size of the micro-domains based upon the characteristics of the subterranean formation in which the micro-crosslinked gel would be used, the temperature of the subterranean formation, the degree of stability required of the micro-crosslinked gel, the flow rate design, the flow geometry, and the costs.

Any suitable method of making a micro-crosslinked gel of the present invention may be used. According to one illustrative embodiment of the invention, a base fluid and a gelling agent may first be combined to form a base gel, which is not crosslinked and not particulate-laden. Particulates may be added to the base gel, however, if desired. A crosslinking agent may then be added to the base gel. Crosslinking may then result in a substantially permanently crosslinked gel comprising particulates. A shear flow may be applied to the substantially permanently crosslinked gel, resulting in a slurry of micro-domains comprising particulates. In other embodiments, this order may be varied in any suitable fashion. For instance, the particulates may be added to the base gel subsequent to the addition of the crosslinking agent. In other embodiments, the particulates may be added during or after the shear flow, resulting in particulates interspersed between micro-domains. Again, these are merely illustrative, and one of ordinary skill in the art with the benefit of this disclosure will be able to determine the most appropriate permutation given a chosen application. Depending of when the particulates are added, more of the particulates may be contained within individual micro-domains rather than between micro-domains, and vice versa.

In some embodiments of the invention, the micro-crosslinked gel may be prepared at the well site. According to one illustrative embodiment, the shear flow may be applied as the substantially permanently crosslinked gel is being introduced into the well bore. In some embodiments, a second treatment fluid (e.g., a base fluid, a base gel, a macro-crosslinked gel, etc.) may be combined with the permanently crosslinked gel as it is being introduced into the well bore. In other embodiments, a second treatment fluid may be combined with the micro-crosslinked gel as it is being introduced into the well bore. These are merely illustrative, and one of ordinary skill in the art with the benefit of this disclosure will be able to determine the most appropriate permutation given a chosen application.

In some embodiments of the invention, the micro-crosslinked gel and/or any of the components of the micro-crosslinked gel may be prepared remotely and transported to the well site for use in the subterranean application. In such embodiments, the substance to be transported should have sufficient chemical stability to survive transportation.

Gelling agents suitable for use in micro-domains of the present invention include, but are not limited to, biopolymers (e.g., xanthan, succinoglycan, and diutan), clarified biopolymers (e.g., clarified xanthan, clarified diutan, clarified scleroglucan), cellulose, cellulose derivatives (e.g., hydroxyethyl cellulose, carboxyalkyl cellulose, carboxyalkyl hydroxyalkyl cellulose, hydroxypropyl cellulose), guar, and guar derivatives (e.g., hydroxypropyl guar, hydroxylalkyl guar, carboxyalkyl hydroxyalkyl guar, carboxymethyl guar). Suitable gelling agents also may include synthetic polymers (e.g., polyacrylamide, polyacrylate, polyacrylamide copolymers, and polyacrylate copolymers). Commercially available examples of suitable gelling agents include, but are not limited to, those that are available from Halliburton Energy Services, Inc., of Duncan, Okla., under the trade name "WG-37" and "N-VIS®."

In some embodiments, clarified xanthan may be an especially suitable gelling agent. In some embodiments, suitable clarified xanthans are capable of hydrating in a brine to produce an increase in viscosity. In some embodiments, suitable clarified xanthans may have been treated with methods involving enzymes or any other suitable method, inter alia, to remove any debris from the xanthan polymer, for example, residual cellular structures, such as cell walls, from a standard xanthan. In some embodiments, suitable clarified xanthans may be produced from genetically modified or bioengineered strains of bacteria or other strains of bacteria that allow the clarified xanthan to have improved functional properties such as filterability, turbidity, etc. In one embodiment, suitable clarified xanthans may be modified by genetic engineering or bacteria selection or the result of chemical treatment or derivatization of a xanthan. An example of such a modification would be where a portion of the xanthan is oxidized or hydrolyzed. In one embodiment, the clarified xanthan may be modified, such as nonacetylated and/or nonpyruvylated xanthan. Another example of modified xanthan is partially oxidized xanthan. In some embodiments, suitable clarified xanthan also may be present in a form that will only partially hydrate or will not hydrate at ambient temperature. This form of clarified xanthan may be chemically modified, chemically coated, genetically modified, or produced from a new strain of bacteria.

In some embodiments, clarified diutan may be an especially suitable gelling agent. In some embodiments, suitable clarified diutans may have been treated with enzymes or the like to remove residual cellular structures, such as cell walls. In some embodiments, suitable clarified diutans may be produced from genetically modified or bioengineered strains of bacteria or other strains of bacteria that allow the clarified diutan to have improved functional properties such as filterability, turbidity, etc. In one embodiment, the clarified diutan may be modified by genetic engineering or bacteria selection or the result of chemical treatment or derivatization of a diutan. An example of such a modification would be where a portion of the diutan is oxidized or hydrolyzed. Suitable clarified diutan also may be present in a form that will only partially hydrate or will not hydrate at ambient temperature. This form of clarified diutan may be chemically modified, chemically coated, genetically modified, or produced from a new strain of bacteria. Additional information regarding clarified diutan may be found in U.S. patent application Ser. Nos. 11/704,121, 11/704,598, and 11/704,009, each entitled "Treatment Fluids Comprising Diutan and Associated Methods," the entire disclosure of which is incorporated herein by reference.

In some embodiments, a gelling agent of the present invention comprising a suitable clarified diutan at a 0.1% concentration in deionized water, in a 1 cm optical cell, has a transmittance at 600 nanometers ("nm") wavelength of at least about 65%. In some embodiments, the clarified diutan has a transmittance of at least about 75%. In some embodiments, the clarified diutan has a transmittance of at least about 85%. One of ordinary skill in the art with the benefit of this disclosure will recognize that the transmittance of any particular gelling agent of the present invention also may vary depending on the addition of certain additives, the composition of the gelling agent, the degree of hydration of the clarified diutan, the temperature, and the pH of the gelling agent. For example, ordinary, unclarified diutan such as GEOVIS XT has a transmittance of about 58% or less.

In some embodiments, a gelling agent of the present invention comprising a suitable clarified diutan at a 0.1% concentration in deionized water, in a 1 cm optical cell, has a transmittance at 350 nanometers ("nm") wavelength of at least about 20%. In some embodiments, the clarified diutan has a transmittance of at least about 25%. In some embodiments, the clarified diutan has a transmittance of at least about 30%. In some embodiments, the clarified diutan has a transmittance of at least about 40%. In some embodiments, the clarified diutan has a transmittance of at least about 50%. In some embodiments, the clarified diutan has a transmittance of at least about 60%. In some embodiments, the clarified diutan has a transmittance of at least about 70%. In some embodiments, the clarified diutan has a transmittance of at least about 80%. In some embodiments, the clarified diutan has a transmittance of at least about 90%. One of ordinary skill in the art with the benefit of this disclosure will recognize that the transmittance of any particular gelling agent of the present invention also may vary depending on the addition of certain additives, the composition of the gelling agent, the degree of hydration of the clarified diutan, the temperature, and the pH of the treatment fluid. For example, ordinary, unclarified diutan such as GEOVIS XT has a transmittance of about 18% or less.

A suitable crosslinking agent may be used to crosslink the gelling agent polymer molecules in a suitable crosslinking reaction. Any crosslinking agent that is suitable for crosslinking the chosen monomers/polymers may be used in conjunction with the methods described herein. For example, suitable crosslinking agents typically comprise at least one metal ion that is capable of crosslinking gelling agent polymer molecules. Examples of suitable crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof. Suitable crosslinking agents also may include a crosslinking agent composition that may produce delayed crosslinking of an aqueous solution of a crosslinkable organic polymer, as described in U.S. Pat. No. 4,797,216, the entire disclosure of which is incorporated herein by reference. Suitable crosslinking agents also may include a crosslinking agent composition that may comprises a zirconium compound having a valence of +4, an alpha-hydroxy acid, and an amine compound as described in U.S. Pat. No. 4,460,751, the entire disclosure of which is incorporated herein by reference. The desired properties of the resulting micro-crosslinked gel and how it interacts with the breakers and/or other additives that are being used may guide the choice of which crosslinking agent to use.

Crosslinking agents that are not as suitable for use in the present invention are those that do not form substantially permanent crosslinks. For example, a guar-based gelling agent that has been crosslinked with a borate-based crosslinking agent may not be suitable for use in the present invention.

An example of a suitable commercially available zirconium-based crosslinking agent is "CL-24™" from Halliburton Energy Services, Inc., Duncan, Okla. An example of a suitable commercially available titanium-based crosslinking agent is "CL-39™" from Halliburton Energy Services, Inc., Duncan Okla. Divalent ions also may be used; for example, calcium chloride and magnesium oxide. An example of a suitable divalent ion crosslinking agent is commercially available as "CL-30™" from Halliburton Energy Services, Inc., Duncan, Okla. Another example of a suitable crosslinking agent is "CL-15™" from Halliburton Energy Services, Inc., Duncan, Okla. Another that may be suitable is "FDP-S881-07," a commercially available aluminum acetate crosslinking agent, available from Halliburton Energy Services, Inc., in Duncan, Okla.

Where present, the crosslinking agent should be included to form a micro-crosslinked gel of the present invention generally in an amount sufficient, among other things, to provide the desired degree of crosslinking. In some embodiments, the crosslinking agent may be present in the base gel of the present invention in an amount in the range of from about 0.01% to about 1% by weight of the micro-crosslinked gel. In some instances, it could be present in more than 1%, but this may present some economic losses.

Buffering compounds may be used if desired, e.g., to delay or control the crosslinking reaction. These may include glycolic acid, carbonates, bicarbonates, acetates, phosphates, and any other suitable buffering agent. By adjusting the pH of the fluid, one might be able to stabilize the polymers within the micro-domains.

Suitable base fluids for the micro-domains may be aqueous or non-aqueous. In those embodiments where the base is aqueous, the water used to form the base may be fresh water, salt water, brines (e.g., water comprising at least one salt), formation brines, heavy brines, sea water, or any other aqueous liquid that does not adversely react with the other components. The brines may comprise $H_2O$ soluble salts. In certain exemplary embodiments, suitable $H_2O$ soluble salts may comprise sodium chloride, sodium iodide, sodium bromide, calcium chloride, calcium bromide, zinc bromide, potassium carbonate, cesium formate, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium chloride, any combination thereof, and any derivative thereof Other examples of suitable base fluids may include, but are not limited to, glycerin, glycols, polyglycol amines, polyols, any derivative thereof, and any combination thereof.

Particulates suitable for use in the methods of the present invention may be of any size and shape combination known in the art as suitable for use in fracturing operations. Particulates may be either rigid or deformable. Generally, where the chosen particulate is substantially spherical, suitable particulates have a size in the range of from about 2 to about 400 mesh, U.S. Sieve Series. In some embodiments of the present invention, the particulates have a size in the range of from about 8 to about 120 mesh, U.S. Sieve Series.

In some embodiments of the present invention, it may be desirable to use substantially non-spherical particulates. Suitable substantially non-spherical particulates may be cubic, polygonal, fibrous, or any other non-spherical shape. Such substantially non-spherical particulates may be, for example, cubic-shaped, rectangular-shaped, rod-shaped, ellipse-shaped, cone-shaped, pyramid-shaped, or cylinder-shaped. That is, in embodiments wherein the particulates are substantially non-spherical, the aspect ratio of the material may range such that the material is fibrous to such that it is cubic, octagonal, or any other configuration. Substantially non-spherical particulates are generally sized such that the longest axis is from about 0.02 inches to about 0.3 inches in length. In other embodiments, the longest axis is from about 0.05 inches to about 0.2 inches in length. In one embodiment, the substantially non-spherical particulates are cylindrical having an aspect ratio of about 1.5 to 1 and about 0.08 inches in diameter and about 0.12 inches in length. In another embodiment, the substantially non-spherical particulates are cubic having sides about 0.08 inches in length. The use of substantially non-spherical particulates may be desirable in some embodiments of the present invention because, among other things, they may provide a lower rate of settling when slurried into a fluid, as is often done to transport particulates to desired locations within subterranean formations. By so resisting settling, substantially non-spherical particulates may provide improved particulate distribution as compared to more spherical particulates.

In poorly consolidated formations (that is, formations that, when assessed, fail to produce a core sample that can be satisfactorily drilled, cut, etc.) the use of substantially non-spherical particulates also may help to alleviate the embedment of particulates into the formation surfaces (such as a fracture face). As is known by one skilled in the art, when substantially spherical particulates are placed against a formation surface under stress, such as when they are used to prop a fracture, they are subject to point loading. By contrast, substantially non-spherical particulates may be able to provide a greater surface area against the formation surface and thus may be better able to distribute the load of the closing fracture.

Particulates used in the present invention may comprise any material suitable for use in subterranean applications. Suitable materials that may be used as particulates (e.g., proppant and/or gravel particulates) include, but are not limited to: sand; bauxite; ceramic materials; glass materials; polymer materials; Teflon® materials; nut shell pieces; seed shell pieces; fruit pit pieces; wood; composite particulates; light weight proppant; cured resinous particulates comprising nut shell pieces, seed shell pieces, inorganic fillers, and/or fruit pit pieces; and combinations thereof. Additionally, composite particulates may be utilized as proppant and/or gravel particulates. Such composites may include a binder and a filler material, wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

In some embodiments of the present invention, the particulates may be composed of at least one high density plastic. As used herein, the term "high density plastic" refers to a plastic having a specific gravity of greater than about 1. The preferable density range is from about 1 to about 2. More preferably, the range is from about 1 to about 1.3. The most preferable is from about 1.1 to 1.2. In addition to being a high density plastic, plastics suitable for use in the present invention generally exhibit a crystallinity of greater than about 10%. In some embodiments, the high density plastic used to form the particulates of the present invention exhibits a crystallinity of greater than about 20%. While the material is referred to as "high density," it will be readily understood by one skilled in the art that the density is "high" relative to other plastics, but may be low as compared to traditional particulate densities. For example, Ottawa sand may exhibit a specific gravity of about 2.65, whereas man-made ceramic particulate materials generally have specific gravities ranging from about 2.7 to about 3.6. The relatively low density of the high density plastics used to create the particulates of the present invention may be beneficial to an even distribution when the particulates are slurried into a fluid such as a fracturing or carrier fluid. Such even distribution may be particularly helpful in forming a partial monolayer proppant pack that is capable of holding open the majority of a fracture. Uneven distribution could result in a situation wherein a portion of a fracture is propped while another portion is substantially void of particulates and thus, does not remain open once the hydraulic pressure is released.

Some well-suited high density plastic materials include polyamide 6 (Nylon 6), polyamide 6,6 (Nylon 6,6), acrylic, acrylonitrile butadiene styrene (ABS), ethylene vinyl alcohol, polycarbonate/PET polyester blend, polyethylene terephthalate (PET), unreinforced polycarbonate/polybutylene terephthalate (PC/PBT) blend, PETG copolyester, polyetherimide, polyphenylene ether, molded polyphenylene sulfide (PPS), heat resistant grade polystyrene, polyvinylbenzene, polyphenylene oxide, a blend of polyphenylene oxide and nylon 6/6, acrylonitrile-butadiene-styrene, polyvinylchloride, fluoroplastics, polysulfide, polypropylene, styrene acrylonitrile, polystyrene, phenylene oxide, polyolefins, polystyrene divinylbenzene, polyfluorocarbons, polyethers etherketones, polyamide imides, and combinations thereof. Some other well-suited high density plastic materials include oil-resistant thermoset resins such as acrylic-based resins, epoxy-based resins, furan-based resins, phenolic-based resins, phenol/phenol formaldehyde/furfuryl alcohol resins, polyester resins, and combinations thereof.

In some embodiments of the present invention, it may be desirable to reinforce the particulates to increase their resistance to a crushing or deforming force. Suitable reinforcing materials include high strength particles such as bauxite, nut hulls, ceramic, metal, glass, sand, asbestos, mica, silica, alumina, and any other available material that is smaller in size than the desired, final high density plastic particulate and that is capable of adding structural strength to the desired, final high density plastic particulate. In some embodiments of the present invention, the reinforcing material may be a fibrous material such as glass fibers or cotton fibers. Preferably, the reinforcing material is chosen so as to not unduly increase the specific gravity of the final particulate.

In some embodiments, the particulates may be coated with an adhesive substance, so that they will have the tendency to adhere to one another or to other particulates that may be present in the subterranean formation. Adhesive substances suitable for use in the present invention include non-aqueous tackifying agents; aqueous tackifying agents; silyl-modified polyamides; and curable resin compositions that are capable of curing to form hardened substances. In addition to encouraging the particulates to form aggregates, the use of an adhesive substance may yield a propped fracture that experiences very little or no undesirable particulate flow back. Adhesive substances may be applied to the particulates on-the-fly, at the well site, or directly prior to pumping the fluid-particulate mixture into the well bore.

In some embodiments of the present invention, a portion of the particulates may be formed from degradable material. One purpose of including degradable particles may be to ensure the porosity of a propped fracture, be it a partial monolayer fracture or a traditional propped fracture. Over time, the degradable material may degrade in situ, causing the degradable particles to be substantially removed from the propped fracture, and leaving voids between the particulates. These voids may enhance the porosity of the propped fracture, which may result, inter alia, in enhanced permeability. Degradable materials that may be used in conjunction with the present invention include, but are not limited to, degradable polymers, dehydrated compounds, and mixtures thereof. Such degradable materials are capable of undergoing an irreversible degradation downhole.

Suitable examples of degradable polymers that may be used in accordance with the present invention include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactides); poly(glycolides); poly($\epsilon$-caprolactones); poly(hydroxybutyrates); poly(anhydrides); aliphatic polycarbonates; poly(ortho esters); poly(amino acids); poly(ethylene oxides); and polyphosphazenes. Polyanhydrides are another type of particularly suitable degradable polymer useful in the present invention. Examples of suitable polyanhydrides include poly (adipic anhydride), poly(suberic anhydride), poly(sebacic anhydride), and poly(dodecanedioic anhydride). Other suitable examples include but are not limited to poly(maleic anhydride) and poly(benzoic anhydride). One skilled in the art will recognize that plasticizers may be included in forming suitable polymeric degradable materials of the present invention. The plasticizers may be present in an amount sufficient to provide the desired characteristics, for example, more effective compatibilization of the melt blend components, improved processing characteristics during the blending and processing steps, and control and regulation of the sensitivity and degradation of the polymer by moisture.

Suitable dehydrated compounds are those materials that will degrade over time when rehydrated. For example, a particulate solid dehydrated salt or a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid.

Blends of certain degradable materials and other compounds also may be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. In choosing the appropriate degradable material or materials, one should consider the degradation products that will result. The degradation products should not adversely affect subterranean applications or components. The choice of degradable material also can depend, at least in part, on the conditions of the well, e.g., BHST. For instance, lactides have been found to be suitable for lower temperature wells, and polylactide have been found to be suitable for well bore temperatures above this range. Poly(lactic acid) and dehydrated salts may be suitable for higher temperature wells. Also, in some embodiments a preferable result is achieved if the degradable material degrades slowly over time as opposed to instantaneously. In some embodiments, it may be desirable when the degradable material does not substantially degrade until after the degradable material has been substantially placed in a desired location within a subterranean formation.

In some embodiments of the present invention, from about 10% to about 90% of the total particulates used are degradable. In other embodiments, from about 20% to about 70% of the total particulates used are degradable. In still other embodiments, from about 25% to about 50% of the total particulates used are degradable. One of ordinary skill in the art with the benefit of this disclosure will recognize an optimum concentration of degradable material that provides desirable values in terms of enhanced permeability without undermining the stability of the proppant and/or gravel pack.

The micro-crosslinked gels of the present invention may comprise one or more of any additional additives known in the art. Examples of such additional additives include, but are not limited to, hydrate inhibitors, clay stabilizers, sulfide scavengers, fibers, nanoparticles, consolidating agents (such as resins and/or tackifiers), salts, salt substitutes (such as tetramethyl ammonium chloride) soaps, surfactants, co-surfactants, crosslinking agents, carboxylic acids, acids, fluid loss control agent, buffers, gas, foamers, defoamers, emulsifiers, demulsifiers, iron control agents, solvents, mutual solvents, particulate diverters, gas phase, carbon dioxide, nitrogen, other biopolymers, synthetic polymers, corrosion inhibitors, corrosion inhibitor intensifiers, pH control additives, scale inhibitors, asphaltene inhibitors, paraffin inhibitors, catalysts, stabilizers, chelants, clay control agents, biocides, bactericides, friction reducers, antifoam agents, bridging agents, dispersants, flocculants, $H_2S$ scavengers, $CO_2$ scavengers, oxygen scavengers, lubricants, viscosifiers, breakers, breaker activators, weighting agents, relative permeability modifiers (such as HPT-1™ chemical additive available from Halliburton Energy Services, Duncan, Okla.), surface modifying agents, resins, particulate materials (e.g., proppant particulates), wetting agents, coating enhancement agents, combinations thereof, and the like. A person skilled in the art, with the benefit of this disclosure, will recognize the types of additives that may be included in a micro-crosslinked gel for a particular application.

The micro-crosslinked gels of the present invention may be useful in a wide variety of subterranean treatment operations. Suitable subterranean applications may include, but are not limited to, fracturing treatments, gravel packing operation, frac-pack operations, and other suitable operations where a viscosified fluid may be used. Micro-crosslinked gels of the present invention may be particularly suitable for use as clean fluids in partial monolayer fracturing, as explained in U.S. patent application Ser. No. 12/101,099, entitled "Clean Fluid Systems for Partial Monolayer Fracturing," filed on the same day herewith, and the entire disclosure of which is incorporated herein by reference. In some embodiments, a micro-crosslinked gel may be utilized in well bore cleanout treatments. Additionally, a micro-crosslinked gel of the present invention having sufficient viscosity may be used to divert the flow of fluids present within a subterranean formation to other portions of the formation. Micro-crosslinked gels also may be suitable to act as a fluid loss control agent in subterranean applications. In some embodiments, the micro-crosslinked gels of the present invention may be used in conjunction with one or more distinct treatment fluids, wherein the micro-crosslinked gels and the distinct treatment fluids may be applied to a subterranean formation in separate, but related, stages.

To facilitate a better understanding of the present invention, the following examples of certain aspects of some embodiments are given. In no way should the following examples be read to limit, or define, the entire scope of the invention.

EXAMPLES

Example 1

Examples of Viscosities at Elevated Temperatures

Steady-state shear viscosities of a base gel, given in FIG. 5, and a micro-crosslinked gel with micro-domains, given in FIG. 4, are measured at 77° F., 150° F., 180° F., 200° F., 215° F., and 245° F. using a StressTech rheometer (commercially available from Reologica Instruments, Inc., Bordentown, N.J.) with a Sealed Cell Cup and Bob. The base gel consists of 823 gallons of Duncan tap water per 1000 gallons of solution, 60 pounds of WG-37 per 1000 gallons of solution, 195 pounds of potassium chloride per 1000 gallons of solution, 20 gallons of "NEA-96M" (commercially available from Halliburton Energy Services, Inc., of Duncan, Okla.) per 1000 gallons of solution, and 0.25 gallons of "HT Breaker" (commercially available from Halliburton Energy Services, Inc., of Duncan, Okla.) per 1000 gallons of solution. The micro-crosslinked gel with micro-domains consists of 823 gallons of Duncan tap water per 1000 gallons of solution, 70 pounds of WG-37 per 1000 gallons of solution, 4650 pounds of sodium bromide per 1000 gallons of solution, 20 gallons of NEA-96M per 1000 gallons of solution, 6 gallons of a 5 wt % solution of "FDP-S881-07" (commercially available from Halliburton Energy Services, Inc., of Duncan, Okla.) in Duncan tap water per 1000 gallons of solution, 10 gallons of "G-SPERSE" (commercially available from Halliburton Energy Services, Inc., of Duncan, Okla.) per 1000 gallons of solution, and 0.25 gallons of HT Breaker per 1000 gallons of solution.

Example 2

Example of a Substantially Permanently Crosslinked Gel

Two fluids are prepared as follows. The first fluid consists of 70 pounds of "WG-35" (commercially available from Halliburton Energy Services, Inc., of Duncan, Okla.) added to 1000 gallons of Duncan tap water, 0.75 gallons of "BA-40L" (commercially available from Halliburton Energy Services, Inc., of Duncan, Okla.) added to 1000 gallons of Duncan tap water, 0.25 gallons of "MO-67" (commercially available from Halliburton Energy Services, Inc., of Duncan, Okla.) added to 1000 gallons of Duncan tap water, 167 pounds of sodium chloride added to 1000 gallons of Duncan tap water, and 2.1 gallons of "CL-28M" (commercially available from Halliburton Energy Services, Inc., of Duncan, Okla.) added to 1000 gallons of Duncan tap water. The second fluid consists of 70 pounds of WG-37 added to 1000 gallons of Duncan tap water, 167 pounds of sodium chloride added to 1000 gallons of Duncan tap water, and 6 gallons of a 5 wt % solution of FDP-S881-07 in Duncan tap water added to 1000 gallons of Duncan tap water. A small-amplitude oscillatory shear ("SAOS") test is performed on each of the sample fluids using a Sealed Cell Cup and Bob on a Stresstech rheometer (commercially available from Reologica Instruments, Inc., Bordentown, N.J.) at 200° F. In this test, a sinusoidal shear strain is applied to the sample in the form of $\gamma=\gamma_0 \sin(\omega)(t)$, where $\gamma_0$ is the strain amplitude and $\omega$ is the oscillation frequency. The shear stress response is $\sigma=G' \gamma_0 \sin(\omega)(t)+G'' \gamma_0 \cos(\omega)(t)$, where G' is the storage modulus, or elastic modulus, in phase with the applied shear strain and G' is the loss modulus, or viscous modulus, out of phase with the applied shear strain (or in phase with the applied shear-strain rate).

Figure 8:
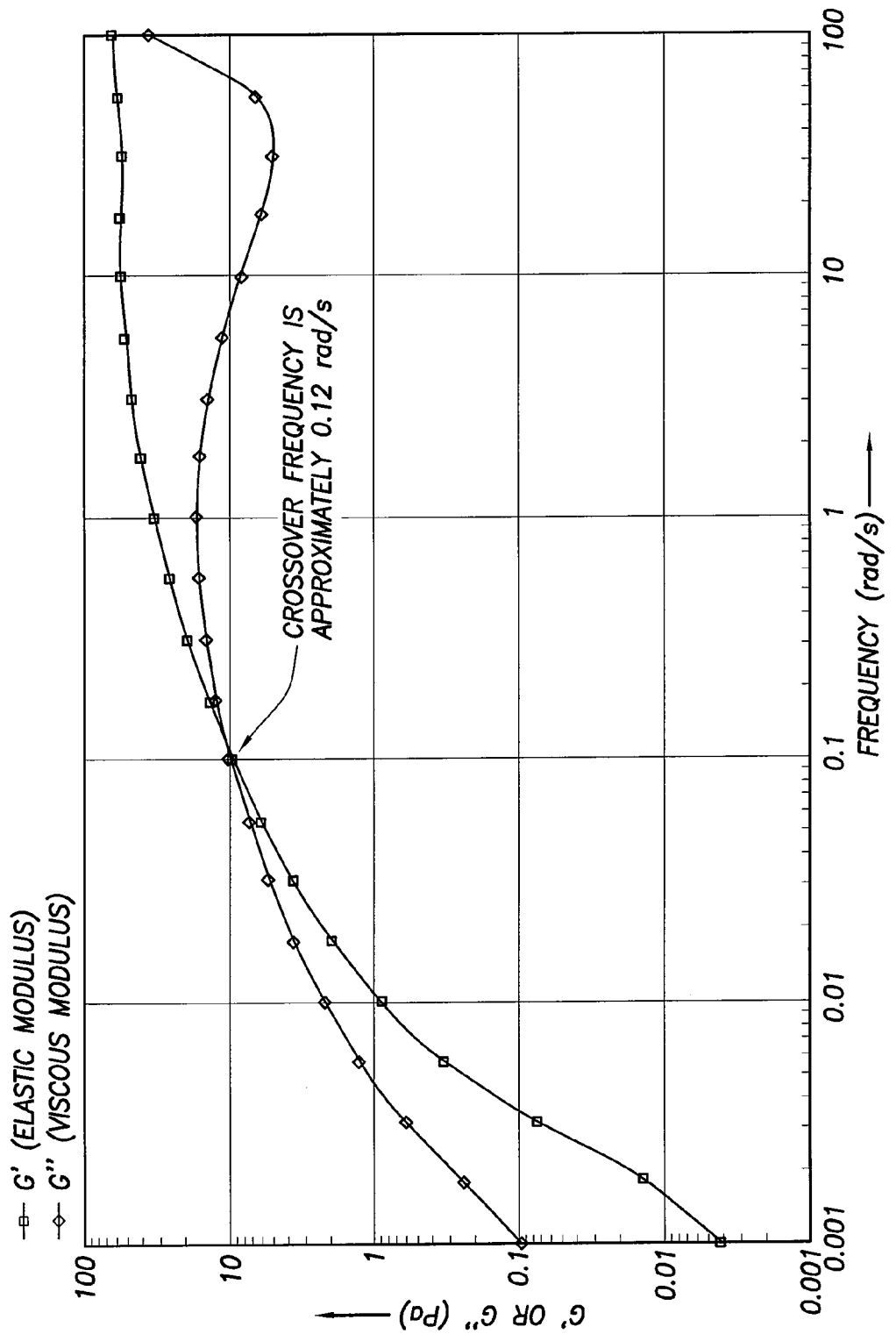
FIG. 8 illustrates an example of the storage modulus and loss modulus versus frequency for a non-permanently crosslinked gel.
Figure 9:
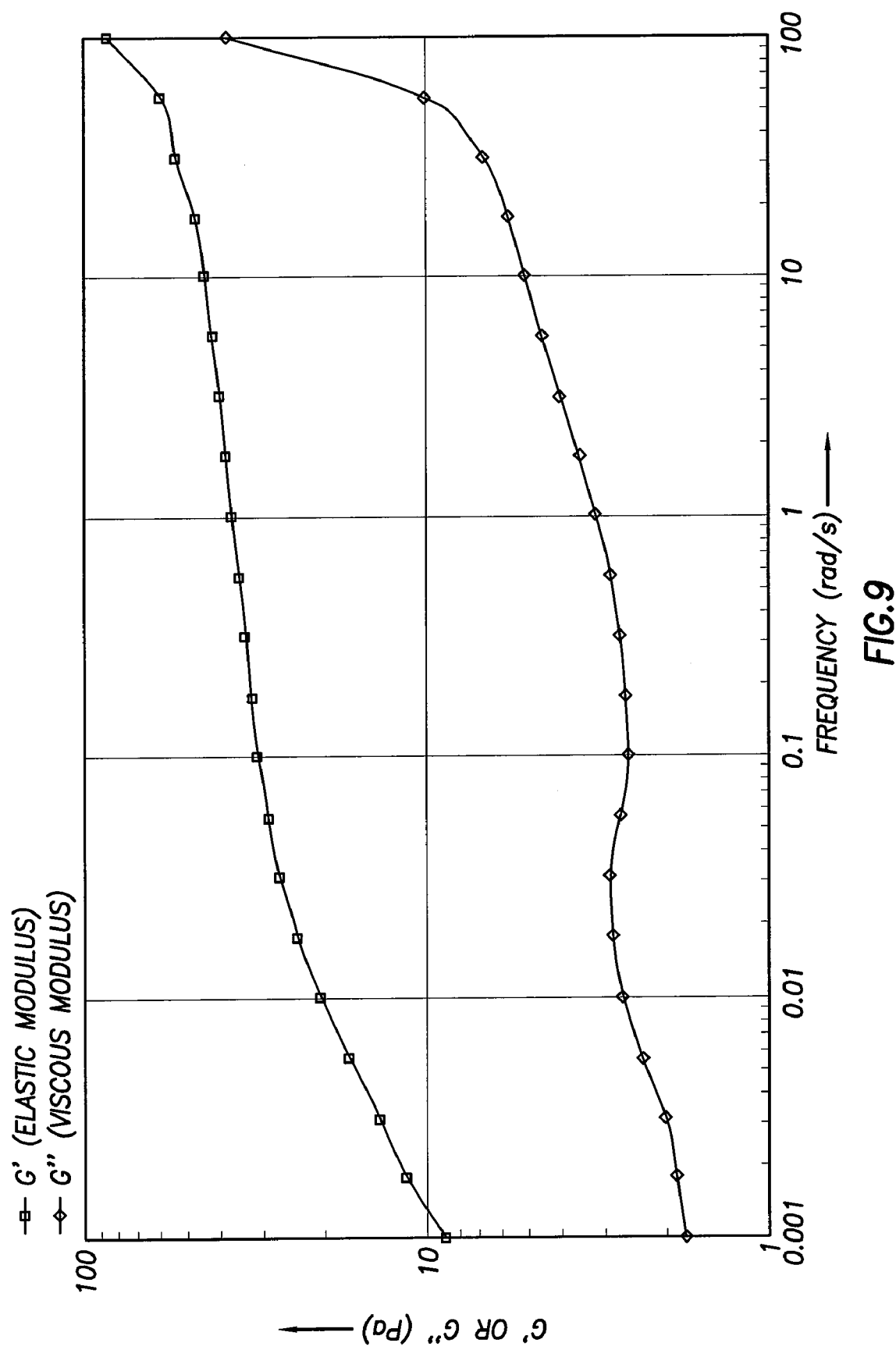
FIG. 9 illustrates an example of the storage modulus and loss modulus versus frequency for a substantially permanently crosslinked gel.

Plots of storage modulus and loss modulus versus frequency from the SAOS frequency sweep for the first and second fluid are provided in FIGS. 8 and 9, respectively. As shown in FIG. 8, the crossover frequency (i.e., the frequency at which th=G") in the lower frequency range of the first fluid is approximately 0.12 radians per second, below which demonstrate the time-scales where the fluid is mostly viscous in nature. FIG. 9 illustrates that there is no observable crossover frequency above 0.001 radians per second for the second fluid, and thus illustrates that above these frequencies, the gel is mostly elastic in nature or predominantly permanently crosslinked.

Example 3

Examples Sand Settling Tests

Preparation of Crosslinked Gravel Pack Fluid

A gelled fluid is prepared in 1,000 mL batches using a Waring blender. The water is added to the blender jar first, with the blender speed adjusted so a vortex forms but no air is entrained into the fluid. The additives are added in the order listed in the fluid recipe. After all the additives except for the crosslinking agent are added to the fluid, the blender speed is adjusted to progressively higher settings in order to maintain a vortex in the fluid without air entrainment. After approximately five to ten minutes of mixing, the blender is turned off, and the fluid is allowed to remain static for a period of about 30 minutes.

The crosslinking agent is added to the fluid during the sand suspension test. See the text following Equation 1 below for the addition point of the crosslinking agent.

Crosslinked Gravel Pack Fluid Sand Suspension Testing

The gelled fluid is prepared as previously described, with all additives present in the gel except for the crosslinking agent. A seal consisting of plastic wrap is placed over the surface of the fluid in the blender jar, the jar lid is applied, and the gelled fluid is then mixed at full blender speed for a period of two minutes. The seal is applied to the fluid to minimize the entrainment of air into the fluid during the shearing process.

The volume of fluid being tested is weighed into a one liter polyethylene bottle, with the fluid volume being 100 mL. The weight in grams is determined by Equation 1:

$$100 \text{ mL} \times \text{Specific Gravity} = \text{Weight of Gel for Sand Settling Test} \qquad \text{Equation 1:}$$

71.90 grams of 30/50 Econoprop proppant (commercially available from Halliburton Energy Services, Inc., of Duncan, Okla.) is added to the volume of fluid. Econoprop proppant and the test fluid are mixed together. The slurry is blended until uniform with an overhead mixer. During this process, the crosslinking agent is added to the slurry. The slurry is poured between two cups several times to ensure complete mixing.

The slurry is immediately poured into a 100 mL glass graduated cylinder, with the cylinder filled completed to the top (approximately 105 mL). The cylinder is placed in a see-through pressurized cell. Water is used to fill the annular space between the cylinder and the see-through cell walls, with the water used as a heat-transfer fluid. The volume of water used is sufficient to fill the annular space up to the 100 mL mark on the graduated cylinder. The see-through cell is sealed and 300 psig of nitrogen pressure was applied. The see-through cell is heated to the test temperature as quickly as possible, with the heat-up tie being approximately 15 minutes. A stop watch is started when the cell reaches the test temperature. At the 5, 10, 20, 30, 60, and 120 minute marks on the stop watch, the amount of clear fluid at the top of the graduated cylinder is recorded.

The dimension of the graduated cylinder used in the sand suspension test is 2.54 cm inside diameter by 18.10 cm in length to the 100 mL volume marker.

The following table gives volumes of additives to be included in 1000 gallons (Field Concentration) and 1000 mL (Laboratory Concentration) of the crosslinked fluid.

TABLE 1

| Additive | Field Concentration | Laboratory Concentration |
|---|---|---|
| Duncan Tap Water | 823 gal | 823 mL |
| WG-37 | 60 lb | 7.20 grams |
| NaBr | 4,650 lb | 558.4 grams |
| NEA-96M ™ Surfactant | 20 gal | 20.0 mL |
| G-Sperse | 10 gal | 10.0 mL |
| FDP-S881-07* | Varies | Varies |

TABLE 2

| | Crosslinking Agent Concentration * in Gallons per 1000 Gallons of Fluid | | | | | |
|---|---|---|---|---|---|---|
| | 0 | 2 | 3 | 4 | 5 | 6 |
| Time (min) | Clear Fluid (mL) at Top of Graduated Cylinder at Listed Time | | | | | |
| 5 | 3 | 0 | 0 | 0 | 0 | 0 |
| 10 | 8 | 0 | 0 | 0 | 0 | 0 |
| 20 | 50 | 30 | 0 | 0 | 0 | 0 |
| 30 | 70 | 45 | 0 | 0 | 0 | 0 |
| 60 | — | 70 | 10 | 0 | 0 | 0 |
| 120 | — | — | 40 | 2 | 0 | 0 |
| Total Volume | 100 mL | 100 mL | 100 mL | 100 mL | 100 mL | 100 mL |

*The FDP-S881-07 crosslinking agent solution is prepared by adding 5% by weight of the FDP-S881-07 crosslinking agent to 95% by weight fresh water. The solution is agitated by magnetic stirrer for 30 minutes to ensure that all of the crosslinking agent solids are dissolved into the solution.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary slightly. Moreover, any numerical range defined by two R numbers as defined in the above is also specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
   providing a micro-crosslinked gel that comprises micro-domains suspended in a discontinuous phase; and
   placing the micro-crosslinked gel into a subterranean formation via a well bore penetrating the subterranean formation at a desired pressure.

2. The method of claim 1, wherein the micro-crosslinked gel further comprises a plurality of particulates.

3. The method of claim 2, wherein the desired pressure is above the fracture gradient of the subterranean formation.

4. The method of claim 3, further comprising:
   providing a fracture in the subterranean formation; and
   depositing one or more of the particulates into a portion of the fracture to form a partial monolayer within the fracture.

5. The method of claim 2, wherein:
   the particulates comprise gravel particulates; and
   the method further comprises forming a gravel pack that comprises at least a portion of the gravel particulates in or near a selected portion of the subterranean formation.

6. The method of claim 2, further comprising allowing the micro-crosslinked gel to remain in the subterranean formation for a period of time in the range of about 2 hours to about 72 hours, wherein:
   the bottom hole static temperature of the well bore is about 150° F. to about 450° F.; and
   at least a majority of the particulates remain in suspension in the micro-crosslinked gel throughout the period of time.

7. The method of claim 1, wherein the method further comprises performing a well bore cleanout treatment.

8. The method of claim 1, wherein at least a portion of the micro-crosslinked gel diverts the flow of a fluid in the subterranean formation.

9. The method of claim 1, wherein at least a portion of the micro-crosslinked gel acts as a fluid loss control agent in the subterranean formation.

10. The method of claim 1, further comprising introducing a treatment fluid to the micro-crosslinked gel during the placing of the micro-crosslinked gel into the subterranean formation.

11. The method of claim 1, wherein the bottom hole static temperature of the well bore is a temperature of up to about 450° F.

12. The method of claim 1, further comprising placing a treatment fluid into the subterranean formation via the well bore penetrating the subterranean formation, wherein the placing of the micro-crosslinked gel and the placing of the treatment fluid occur at different points in time.

13. A method comprising:
providing a base gel, wherein the base gel comprises:
a base fluid; and
a gelling agent;
providing a crosslinking agent;
crosslinking at least a portion of the gelling agent in the base gel with the crosslinking agent to form a substantially permanently crosslinked gel; and
applying shear to the substantially permanently crosslinked gel so as to form a micro-crosslinked gel that comprises at least a plurality of micro-domains wherein the micro-crosslinked gel is suitable for use as a subterranean treatment fluid.

14. The method of claim 13, wherein the micro-crosslinked gel further comprises a plurality particulates.

15. The method of claim 14, wherein at least one of the particulates comprises a degradable material chosen from the group consisting of: a homopolymer, a branched polymer, a polysaccharide, a chitin, a chitosan, a protein, a aliphatic polyester, a poly(lactide), a poly(glycolide), a poly(ε-caprolactone), a poly(hydroxybutyrate), a poly(anhydride), a aliphatic polycarbonate, a poly(ortho ester), a poly(amino acid), a poly(ethylene oxide), a polyphosphazene, a polyanhydride, a poly(adipic anhydride), a poly(suberic anhydride), a poly (sebacic anhydride), a poly(dodecanedioic anhydride), a poly (maleic anhydride), a poly(benzoic anhydride), a particulate solid dehydrated salt, a particulate solid anhydrous borate, and a derivative thereof.

16. The method of claim 14, further comprising placing the micro-crosslinked gel in a subterranean formation at a pressure above the fracture gradient.

17. The method of claim 16, further comprising:
providing a fracture in the subterranean formation; and
depositing one or more of the particulates into a portion of the fracture to form a partial monolayer within the fracture.

18. The method of claim 14, wherein:
the particulates comprises gravel particulates; and
the method further comprises:
placing the micro-crosslinked gel in a subterranean formation; and
forming a gravel pack that comprises at least a portion of the gravel particulates in or near a selected portion of the subterranean formation.

19. The method of claim 13, wherein the gelling agent comprises at least one gelling agent selected from the group consisting of: a biopolymer, a xanthan, a succinoglycan, a diutan, a clarified biopolymer, a clarified xanthan, a clarified diutan, a clarified scleroglucan, a cellulose, a cellulose derivative, a hydroxyethyl cellulose, a carboxyalkyl cellulose, a carboxyalkyl hydroxyalkyl cellulose, a hydroxypropyl cellulose, a guar, a guar derivative, a hydroxypropyl guar, a hydroxyalkyl guar, a carboxyalkyl hydroxyalkyl guar, a carboxymethyl guar, a synthetic polymer, a polyacrylamide, a polyacrylate, a polyacrylamide copolymer, a polyacrylate copolymer, and a derivative thereof.

20. The method of claim 13, wherein the crosslinking agent comprises at least one compound selected from the group consisting of: a zirconium compound, a zirconium lactate, a zirconium lactate triethanolamine, a zirconium carbonate, a zirconium acetylacetonate, a zirconium maleate, a zirconium citrate, a zirconium oxychloride, a zirconium diisopropylamine lactate, a titanium compound, a titanium lactate, a titanium maleate, a titanium citrate, a titanium ammonium lactate, a titanium triethanolamine, a titanium acetylacetonate, a aluminum compound, a aluminum acetate, a aluminum lactate, a aluminum citrate, a antimony compound, a chromium compound, a iron compound, an iron chloride, a copper compounds, a zinc compound, a sodium aluminate, and a derivative thereof.

21. The method of claim 13, further comprising the steps of transporting the micro-crosslinked gel to a well site and introducing the micro-crosslinked gel into a subterranean formation.

22. A method comprising:
providing a base gel, wherein the base gel comprises:
a base fluid; and
a gelling agent;
providing a crosslinking agent;
crosslinking at least a portion of the gelling agent in the base gel with the crosslinking agent to form a substantially permanently crosslinked gel;
applying shear to the substantially permanently crosslinked gel so as to form a micro-crosslinked gel that comprises at least:
a plurality of micro-domains; and
a plurality of particulates; and
placing the micro-crosslinked gel into a subterranean formation via a well bore penetrating the subterranean formation at a pressure that is above the fracture gradient of the subterranean formation.

23. A method comprising:
providing a base gel, wherein the base gel comprises:
a base fluid; and
a gelling agent;
providing a crosslinking agent;
crosslinking at least a portion of the gelling agent in the base gel with the crosslinking agent to form a substantially permanently crosslinked gel;
applying shear to the substantially permanently crosslinked gel so as to form a micro-crosslinked gel that comprises at least:
a plurality of micro-domains; and
a plurality of particulates;
placing the micro-crosslinked gel in a subterranean formation; and
forming a gravel pack in or near a selected portion of the subterranean formation.

* * * * *